United States Patent
Xiong et al.

(10) Patent No.: US 9,697,440 B2
(45) Date of Patent: Jul. 4, 2017

(54) METHOD AND APPARATUS FOR RECOGNIZING CLIENT FEATURE, AND STORAGE MEDIUM

(71) Applicant: TENCENT TECHNOLOGY (SHENZHEN) COMPANY LIMITED, Shenzhen (CN)

(72) Inventors: Pengfei Xiong, Shenzhen (CN); Hailong Liu, Shenzhen (CN); Bo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/647,460

(22) PCT Filed: Sep. 27, 2013

(86) PCT No.: PCT/CN2013/084406
§ 371 (c)(1),
(2) Date: May 27, 2015

(87) PCT Pub. No.: WO2014/082496
PCT Pub. Date: Jun. 5, 2014

(65) Prior Publication Data
US 2015/0310308 A1     Oct. 29, 2015

(30) Foreign Application Priority Data
Nov. 27, 2012 (CN) .......................... 2012 1 0491232

(51) Int. Cl.
G06K 9/62     (2006.01)
G06K 9/00     (2006.01)
G06K 9/52     (2006.01)

(52) U.S. Cl.
CPC ....... *G06K 9/6215* (2013.01); *G06K 9/00087* (2013.01); *G06K 9/00268* (2013.01);
(Continued)

(58) Field of Classification Search
CPC ........... G06K 9/00087; G06K 9/00288; G06K 9/00577; G06K 9/00617; G06K 9/00624;
(Continued)

(56) References Cited

U.S. PATENT DOCUMENTS 5,602,938 A * 2/1997 Akiyama ............. G06K 9/6284
                                                             382/155
6,609,093 B1 * 8/2003 Gopinath ............. G06K 9/6234
                                                             382/190
(Continued)

FOREIGN PATENT DOCUMENTS

CN        1581159 A       2/2005
CN      101236599 A       8/2008
(Continued)

OTHER PUBLICATIONS

Written Opinion issued Feb. 20, 2014 re: Application No. PCT/CN2013/086483; pp. 1-13; citing: CN 102752444 A.
(Continued)

*Primary Examiner* — Eric Rush
(74) *Attorney, Agent, or Firm* — Cantor Colburn LLP (57) ABSTRACT

In the present disclosure, a client feature and a pre-stored template image feature are obtained; the obtained client feature and template image feature are projected according to a preset projection matrix, to generate a projection feature pair, where the projection matrix is formed by training of a first template image feature of a same object and a second template image feature of a different object; and similarity calculation is performed on the projection feature pair
(Continued)

according to a preset similarity calculation rule, to generate a similarity result and prompt the similarity result to a client.

12 Claims, 3 Drawing Sheets

(52) U.S. Cl.
CPC ........... *G06K 9/00288* (2013.01); *G06K 9/52* (2013.01); *G06K 9/6212* (2013.01); *G06K 9/6232* (2013.01); *G06K 9/6234* (2013.01); *G06K 9/6247* (2013.01); *G06K 9/6256* (2013.01); *G06K 9/6259* (2013.01); *G06K 9/6284* (2013.01)

(58) Field of Classification Search
CPC .... G06K 9/00885; G06K 9/46; G06K 9/6202; G06K 9/6214; G06K 9/6215; G06K 9/6232; G06K 9/6234; G06K 9/6235; G06K 9/6239; G06K 9/624; G06K 9/6244; G06K 9/6247; G06K 9/6248; G06K 9/6259; G06K 9/6267; G06K 9/6284; G06K 9/00221
USPC ........ 382/100, 115–119, 124, 156, 157, 159, 382/160, 181, 224
See application file for complete search history.

(56) References Cited

U.S. PATENT DOCUMENTS

| | | | | |
|---|---|---|---|---|
| 6,671,404 B1* | 12/2003 | Kawatani | ............. | G06K 9/6232 382/190 |
| 7,961,956 B1* | 6/2011 | Minter | ................. | G06K 9/6234 382/224 |
| 8,175,412 B2* | 5/2012 | Basri | ........................ | G06K 9/34 382/100 |
| 8,185,490 B1* | 5/2012 | Baggenstoss | ........ | G06N 99/005 706/12 |
| 8,498,454 B2* | 7/2013 | Tu | ....................... | G06K 9/00288 382/118 |
| 2002/0049568 A1* | 4/2002 | Erdogan | ............... | G06K 9/6234 702/189 |
| 2003/0172284 A1* | 9/2003 | Kittler | ................... | G06K 9/6235 713/186 |
| 2008/0082468 A1* | 4/2008 | Long | .................... | G06K 9/6256 706/12 |
| 2013/0129202 A1* | 5/2013 | Huang | ................. | G06K 9/6232 382/160 |
| 2013/0182909 A1* | 7/2013 | Rodriguez-Serrano | .. | G06K 9/34 382/105 |
| 2014/0029839 A1* | 1/2014 | Mensink | .............. | G06K 9/6272 382/224 |

FOREIGN PATENT DOCUMENTS

| | | |
|---|---|---|
| CN | 101520839 A | 9/2009 |
| CN | 101971190 A | 2/2011 |

OTHER PUBLICATIONS

International Search Report issued Jan. 2, 2014 re: Application No. PCT/CN2013/084406; citing: CN 101520839 A, CN 101971190 A, CN 1581159 A and CN 101236599 A.

* cited by examiner

METHOD AND APPARATUS FOR RECOGNIZING CLIENT FEATURE, AND STORAGE MEDIUM

FIELD OF THE TECHNOLOGY

The present disclosure relates to the field of image processing technologies, and in particular, to a method and an apparatus for recognizing a client feature, and a storage medium.

BACKGROUND OF THE DISCLOSURE

With the gradual application and popularity of various terminals, requirements on functions of the terminals are increasingly higher.

Using face image recognition as an example, a face recognition algorithm has already existed in the existing technology. For the face image recognition, similarity between all samples needs to be calculated, so as to determine a user category corresponding to a test image. However, in the field of Internet, because a collecting environment of a registered user is usually greatly different from a collecting environment of a recognized user, so that a same face image presents different modes, resulting in that the face recognition rate is reduced.

Besides, a face verification technology can improve the face recognition rate. Different from the foregoing face image recognition, in face verification, a template library only has a template image of a single user, which is used to determine whether a user corresponding to a test image is the same as that corresponding to the template image.

In an existing face verification technology, principal component on linear discriminant analysis (PCLDA) is mainly used to obtain an identifiable feature of an image, to calculate similarity between a template image feature and a test image feature, and then the similarity is compared with a preset threshold to verify a user corresponding to the test image. For example, it is assumed that after gray normalization, brightness normalization, and feature extraction of all face images, feature vectors of all the face images are $x \in R^d$; the algorithm specifically includes:

(1) Training steps: Calculate, according to training samples labeled with category information, an average value $\mu^k$ (k=1, 2 ... n) of each category of the samples, an average value $\mu$ of all the samples, and an intra-class covariance matrix $S_w$ (a sum of covariance matrices of all categories) and an inter-class covariance matrix $S_b$ (a covariance matrix of an average value of all categories). Via linear discriminant analysis (LDA), a projection matrix v of an original feature is obtained, the inter-class covariance matrix $S_b$ is maximized, and the intra-class covariance matrix $S_w$ is minimized.

$$v = \max_v \left\{ v \left| \frac{v^T S_b v}{v^T S_w v} \right. \right\}$$

In a specific implementation process, because a dimension of an original feature is usually relatively high, before the LDA is performed, principal component analysis (PCA) usually needs to be performed on the feature to reduce the dimension and obtain a main feature pattern.

(2) Testing steps: Project, according to the projection matrix v, an original test sample, to obtain y=vx, then calculate similarity between a template image feature $y_m$ and a test image feature $y_p$, and obtain a verification result by comparing the similarity with a preset threshold.

However, it is found that the existing technology at least has the following technical problems: Because a category corresponding to the sample needs to be determined, and whether two samples belong to a same category is not determined, the recognition efficiency is low; moreover, under an uncontrolled collecting environment, because a relatively big difference exists between intra-class samples corresponding to a same user, an identifiable feature based on intra-class and inter-class information cannot fully describe the original sample feature, and meanwhile, a recognition accuracy rate of a face image is low.

Therefore, technical problems in the existing technology that, because a category corresponding to a sample needs to be determined, and a difference between intra-class samples corresponding to a same user is relatively big, the recognition efficiency of a face image is low, need to be solved.

SUMMARY

One objective of embodiments of the present invention is to provide a method for recognizing a client feature, so as to solve technical problems in the existing technology that, because a category corresponding to a sample needs to be determined, and a difference that exists between intra-class samples corresponding to a same user is relatively big, the recognition accuracy rate of a face image is low.

In order to solve the foregoing technical problems, an embodiment of the present invention provides a method for recognizing a client feature, including:

obtaining a client feature by using an image obtaining terminal, and obtaining a pre-stored template image feature;

projecting the obtained client feature and template image feature according to a preset projection matrix, to generate a projection feature pair, the projection matrix being formed by training of a first template image feature of a same object and a second template image feature of a different object;

performing similarity calculation on the projection feature pair according to a preset similarity calculation rule, to generate a similarity result; the similarity calculation rule including a similarity probability function, and the similarity probability function being generated according to a preset similarity metric function; and prompting the generated similarity result.

Another objective of the embodiments of the present invention is to provide a method for recognizing a client feature, so as to solve technical problems in the existing technology that, because a category corresponding to a sample needs to be determined, and a difference that exists between intra-class samples corresponding to a same user is relatively big, the recognition accuracy rate of a face image is low.

In order to solve the foregoing technical problems, an embodiment of the present invention provides a method for recognizing a client feature, including the following steps:

obtaining a client feature and a pre-stored template image feature;

projecting the obtained client feature and template image feature according to a preset projection matrix, to generate a projection feature pair, the projection matrix being formed by training of a first template image feature of a same object and a second template image feature of a different object;

performing similarity calculation on the projection feature pair according to a preset similarity calculation rule, to generate a similarity result; and prompting the generated similarity result.

Still another objective of the embodiments of the present invention is to provide an apparatus for recognizing a client feature, so as to solve technical problems in the existing technology that, because a category corresponding to a sample needs to be determined, and a difference that exists between intra-class samples corresponding to a same user is relatively big, the recognition efficiency of a face image is low.

In order to solve the foregoing technical problems, an embodiment of the present invention provides an apparatus for recognizing a client feature, including:

a feature obtaining module, configured to obtain a client feature, and obtain a pre-stored template image feature;

a projection module, configured to project the obtained client feature and template image feature according to a preset projection matrix, to generate a projection feature pair, the projection matrix being formed by training of a first template image feature of a same object and a second template image feature of a different object;

a similarity calculation module, configured to perform similarity calculation on the projection feature pair according to a preset similarity calculation rule, to generate a similarity result; and a prompting module, configured to prompt the generated similarity result.

Yet another objective of the embodiments of the present invention is to provide a storage medium, so as to solve technical problems in the existing technology that, because a category corresponding to a sample needs to be determined, and a difference that exists between intra-class samples corresponding to a same user is relatively big, the recognition accuracy rate of a face image is low.

In order to solve the foregoing technical problems, an embodiment of the present invention provides a storage medium, having a processor executable instruction stored therein, and the processor executable instruction being used to enable a processor to complete the following operations:

obtaining a client feature and a pre-stored template image feature;

projecting the obtained client feature and template image feature according to a preset projection matrix, to generate a projection feature pair, the projection matrix being formed by training of a first template image feature of a same object and a second template image feature of a different object;

performing similarity calculation on the projection feature pair according to a preset similarity calculation rule, to generate a similarity result; and prompting the generated similarity result.

Compared with the existing technology, in the present disclosure, a projection matrix and a similarity calculation rule are preset, where the projection matrix is formed by training of a first template image feature of a same object (a positive sample) and a second template image feature of a different object (a negative sample); therefore, in the present disclosure, category information of a training sample is not needed, thereby improving image recognition efficiency; moreover, learning based on a positive and negative sample avoids requirements of various learning problems on the training sample, and under an uncontrollable collecting environment, identification information extraction can be implemented better, and further, an image recognition accuracy rate is also improved.

In order to make the foregoing content of the present disclosure clearer and more understandable, preferred embodiments are specifically described in detail in the following with reference to the accompanying drawings.

DESCRIPTION OF EMBODIMENTS

Referring to the drawings, a same component symbol represents a same component, and a principle of the present disclosure is described by using an example in which the present disclosure implemented in an appropriate running environment. The following descriptions are based on illustrated specific embodiments of the present invention, and should not be regarded as limitations on other specific embodiments of the present invention that are not described herein in detail.

In the following descriptions, specific embodiments of the present invention are described with reference to steps and symbols executed by one or more computers, unless otherwise specified. Therefore, it may be mentioned for several times that the steps and operations are executed by computers. Computer execution mentioned in this specification includes an operation of a computer processing unit that represents an electronic signal of data in a structural form. This operation converts the data or maintains the data in a location in a memory system of the computer, and may be reconfigured to change operation of the computer, or, operation of the computer may be changed in a manner well known by a person skilled in the art. A data structure maintained by the data is a physical location of the memory, and has a specific feature defined by the data structure. However, the principle of the present disclosure described by the foregoing words does not represent a limitation. A person skilled in the art may know that the following many steps and operations may also be implemented in hardware.

According to the principle of the present disclosure, operation is performed by using many other general or specific-purpose operations, communications environments or configurations. Examples of well known operation systems, environments and configurations suitable for the present disclosure may include (but not limited to): a handheld telephone, a personal computer, a server, a multi-processor system, a microcomputer-based system, a main structure computer, and a distributed operation environment that includes any of the foregoing systems or apparatuses.

The term "module" used in this application may be regarded as a software object executed on the operation system. Different components, modules, engines, and services described in this specification may be regarded as implementation objects on the operation system. An apparatus or a method described in this specification is preferably implemented in a manner of software, and certainly, may also be implemented on hardware, which both fall within the protection scope of the present disclosure.

Figure 1:
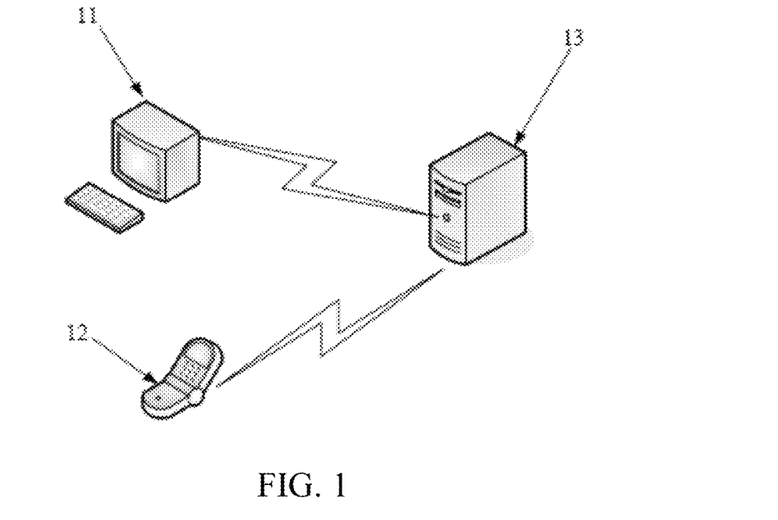
FIG. 1 is a schematic diagram of a running environment of a method for recognizing a client feature according to an embodiment of the present invention.

Referring to FIG. 1, FIG. 1 is a schematic diagram of a running environment of a method for recognizing a client feature according to an embodiment of the present invention, where the running environment includes a data uploading terminal 11, an image obtaining terminal 12, and a server. The data uploading terminal 11 and the image obtaining terminal 12 are both connected to the server 13 by using an interconnection network.

The data uploading terminal 11 is configured to provide a template image feature to the server 13, and the server 13 is configured to set a projection matrix and a similarity calculation rule, where the projection matrix is formed by training of the template image feature uploaded by the data uploading terminal 11. After a client feature of the image obtaining terminal 12 is received, the client feature and the template image feature are projected according to the projection matrix to generate a projection feature pair, and similarity calculation is performed on the projection feature pair according to a preset similarity calculation rule to generate a similarity result, and the similarity result is prompted to the image obtaining terminal 12.

The data uploading terminal 11 or the image obtaining terminal 12 not only may be constituted by a desktop computer, but also may be constituted by a terminal that has a storage unit and has an operation capability due to a microprocessor installed therein, such as a notebook computer, a workstation, a palmtop computer, an ultra mobile personal computer (UMPC), a tablet PC, a personal digital assistant (PDA), a web pad, and a portable telephone.

The interconnection network may include a data communication network that includes a local area network (LAN), a metropolitan area network (MAN), a wide area network (WAN), Internet, or the like, and also includes a telephone network, or the like, and whether a wired or wireless communication manner is used is not limited in the present disclosure.

Figure 2:
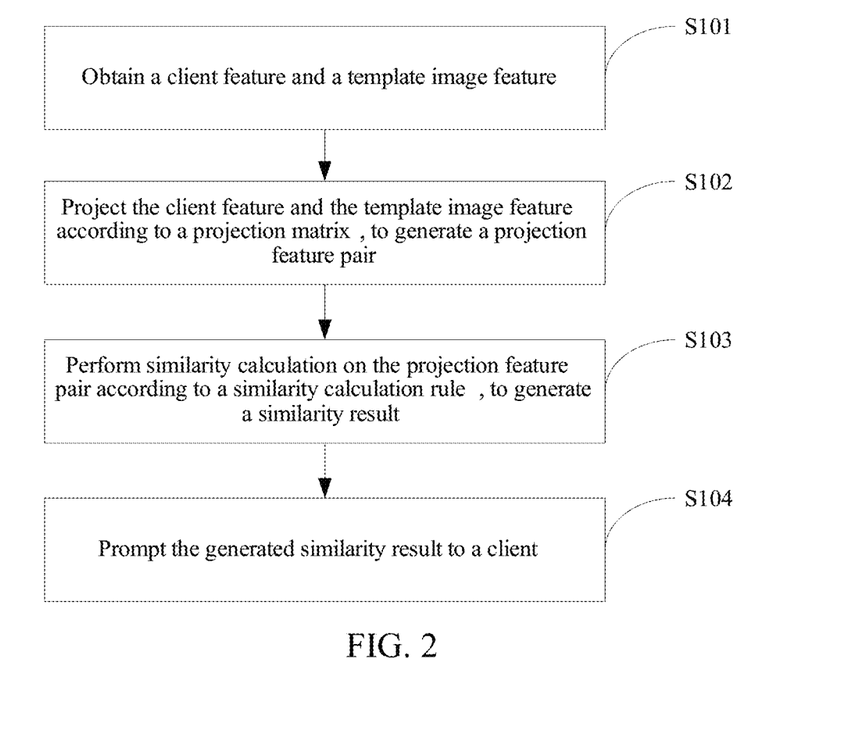
FIG. 2 is a schematic flowchart of a preferred embodiment of a method for recognizing a client feature according to the present disclosure.

Referring to FIG. 2, FIG. 2 is a schematic flowchart of a preferred embodiment of a method for recognizing a client feature according to the present disclosure.

In step S101, the server 13 obtains a client feature and a template image feature.

In a specific implementation process, the server 13 is connected to the image obtaining terminal 12 by using an interconnection network, and obtains the client feature by using the image obtaining terminal 12 (such as a camera phone, or a computer camera), where the client feature is, for example, face data. The template image feature is pre-stored in the server 13. Certainly, the template image feature may be provided by the data uploading terminal 11, or may be stored in the data uploading terminal 11, or may even be stored in a storage device of the image obtaining terminal 12.

In step S102, the server 13 projects the client feature and the template image feature according to a preset projection matrix, to generate a projection feature pair.

In this embodiment of the present invention, after receiving the template image feature provided by the data uploading terminal 11, the server 13 forms the projection matrix by training a first template image feature of a same object (a positive sample) and a second template image feature of a different object (a negative sample). For specific content, refer to FIG. 3 and detailed descriptions of FIG. 3, and no further details are provided herein again.

In step S103, the server 13 performs similarity calculation on the projection feature pair according to a preset similarity calculation rule, to generate a similarity result.

For detailed descriptions of the similarity probability metric function, refer to FIG. 2 and detailed descriptions of FIG. 2, and no further details are provided herein again.

The similarity calculation rule includes a similarity probability function, and the similarity probability function is generated according to a preset similarity metric function. The similarity probability function is a nonlinear probability function. The similarity metric function is used to calculate the projection feature pair.

The step of performing similarity calculation on the projection feature pair according to a preset similarity calculation rule, to generate a similarity result includes: performing similarity calculation on the projection feature pair according to the preset similarity probability function, to generate a similarity probability; determining whether the similarity probability is greater than or equal to a preset threshold; if the similarity probability is greater than or equal to the preset threshold, determining that the client feature and the pre-stored template image feature belong to a same category; and if the similarity probability is less than the preset threshold, determining that the client feature and the pre-stored template image feature do not belong to a same category.

In step S104, the server 13 sends the generated similarity result to the image obtaining terminal 12, and the image obtaining terminal 12 prompts the similarity result to a user, for example, prompt the similarity result to the user by voice prompt or text prompt.

Figure 3:
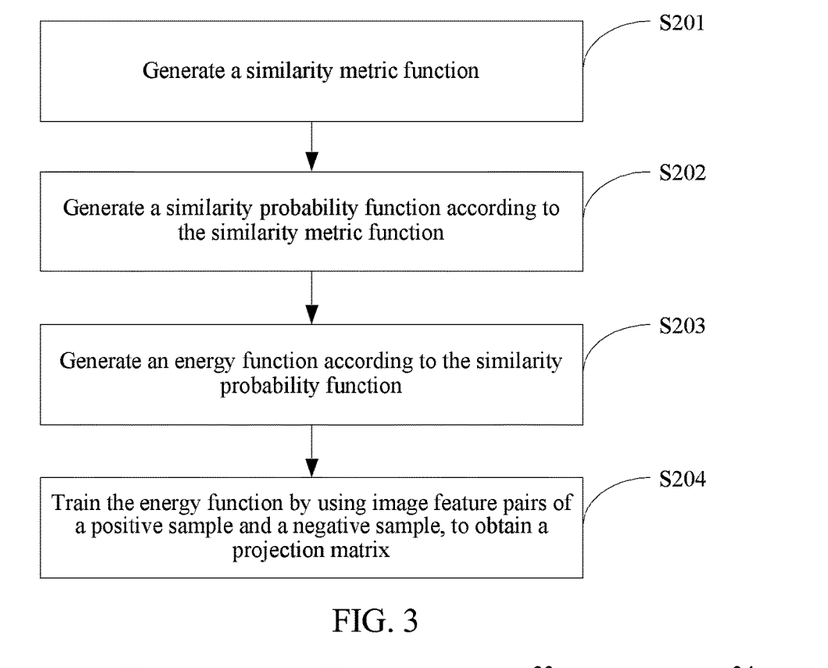
FIG. 3 is a schematic flowchart of forming a projection matrix and a similarity calculation rule according to the present disclosure.

Referring to FIG. 3, FIG. 3 is a schematic flowchart of forming a projection matrix and a similarity calculation rule according to the present disclosure.

In step S201, a similarity metric function is generated.

After the similarity metric function is generated, a template image feature A and a template image feature B are chosen from a database of a terminal Statistical analysis is performed, by using the similarity metric function, on an image feature pair constituted by the template image feature A and the template image feature B.

In this embodiment of the present invention, a chi-square distance is used as a histogram to collect statistics on the image feature pair constituted by the template image feature A and the template image feature B. For example, refer to the following formula (1) for the similarity metric function:

$$dist(x_1, x_2) = \sum_{i=1}^{m} \frac{(x_{1i} - x_{2i})^2}{x_{1i} + x_{2i}} \tag{1}$$

Based on features described in the histogram, for example, in a local binary pattern (LBP) and variants thereof, and scale invariant feature transform (SIFT) and variants thereof, a metric function can better describe similarity between images. In a specific implementation process, based on different feature patterns, different similarity metric functions may be defined, and therefore, the similarity metric function is not limited to the foregoing chi-square distance, but may also correspond to any feature vector distance such as a Euclidean distance, a Mahalanobis distance, or a Cosine distance. For example, based on textural feature description such as a gabor function, a Cosine distance may be chosen preferably.

In step S202, a similarity probability function is generated according to the similarity metric function. For example, refer to the following formula (2) for the similarity probability function:

$$QCS(x_i,x_j)=(1+\exp(dist(x_i,x_j)-b))^{-1} \quad (2)$$

In the formula (2), ($x_i$, $x_j$) represents the image feature pair constituted by the template image feature A and the template image feature B. When a distance between the template image feature A and the template image feature B is greater, a result obtained from the formula (2) is smaller, which indicates smaller similarity between the template image feature A and the template image feature B. In the formula (2), b is a metric parameter, QCS is the similarity probability function, dist is the similarity metric function, and exp is an exponential function with a base being a natural logarithm e.

Functions of the similarity metric function shown in the foregoing formula (1) and the similarity probability function shown in the formula (2) are both performing similarity calculation on different image features. A difference between the similarity metric function and the similarity probability function lies in that: the similarity metric function is used to generate a first-dimension similarity result, for example, a two-dimensional linear similarity result; while the similarity probability function is used to generate a second-dimension similarity result, for example, a three-dimensional nonlinear similarity result.

In step S203, an energy function is generated according to the similarity probability function.

In step S204, the energy function is trained by using an image feature pair of a positive sample and a negative sample, to obtain a projection matrix.

In a specific implementation process, all template image features in the terminal are obtained, and all the template image features are divided into an image feature pair corresponding to a same individual and image feature pairs corresponding to different individuals. An image feature pair corresponding to a same object may be defined as the positive sample and image feature pairs corresponding to different objects are defined as the negative sample. In a process of obtaining the positive sample and the negative sample, the number of pairs of the positive sample is made equal to the number of pairs of the negative sample, that is:

$$S=\{(y_i,y_j)|y_i,y_j \text{ belong to a same object}\};$$

$$D=\{(y_i,y_j)|y_i,y_j \text{ belong to different objects}\}.$$

Based on an image feature pair constituted by the positive sample and the negative sample, an energy function may be generated. The energy function includes a projection matrix and a similarity metric parameter. For example, the energy function is the following formula (3):

$$L(A) = \sum_{i,j \in S} \log(QCS(y_i, y_j)) + \sum_{i,j \in D} \log(1 - QCS(y_i, y_j)) \quad (3)$$

$y_i$, $y_j$ each correspond to a projection feature of an original feature: $y_i = Ax_i$.

After the energy function is obtained, the energy function is trained by using the positive sample and the negative sample. In a specific implementation process, in this embodiment of the present invention, optimal solution is performed on the foregoing energy function in a manner of gradient descent in a limited way. For example, a projection matrix $A_0$ and a metric parameter $b_0$ are initialized first, and then a gradient of the energy function to a projection matrix A and a metric parameter b are calculated. Refer to the following formulas (4) and (5):

$$\frac{\partial L(A, b)}{\partial A} = \left( \sum_{i,j \in S} \frac{1}{h(y_i, y_j)_A} \frac{\partial h(y_i, y_j)_A}{\partial A} - \sum_{i,j \in D} \frac{1}{1 - h(y_i, y_j)_A} \frac{\partial h(y_i, y_j)_A}{\partial A} \right) \quad (4)$$

$$\frac{\partial L(A, b)}{\partial b} = \left( \sum_{i,j \in S} 1 - QCS(y_i, y_j) + \sum_{i,j \in D} QCS(y_i, y_j) \right) \quad (5)$$

Finally, the projection matrix A and the metric parameter b are updated, to obtain the following formulas (6) and (7):

$$A_{t+1} = A_t + \alpha \frac{\partial L(A, b)}{\partial A} \quad (6)$$

$$b_{t+1} = b_t + \alpha \frac{\partial L(A, b)}{\partial b} \quad (7)$$

Based on an original feature of the projection matrix A, a projection feature difference is calculated, the energy function is trained continuously, and finally under the foregoing energy function, when similarity between positive samples is the greatest and similarity between negative samples is the smallest, an obtained matrix is a projection matrix.

In this embodiment of the present invention, a training manner for a projection matrix may be expanded based on a neural network idea. In this embodiment of the present invention, the training manner for a projection matrix is similar to a single-layer neural network, which can directly obtain the projection matrix A through training; for a double-layer neural network, a hidden-layer network weight $A_1$ may be dynamically updated, and an output-layer network weight $A_2$ keeps unchanged. Feature update of the hidden layer and the output layer respectively correspond to a square feature and a square-root feature $A_1$. In weight update based on gradient descent, an optimal hidden-layer network weight $A_1$ is implemented, and a final hidden-layer network weight $A_1$ and output-layer network weight $A_2$ are used as a final feature transformation model, that is a projection matrix $A=g(A_1, A_2)$.

Back to FIG. 2, in step S102, based on the feature transformation model in step S203, an original feature $x_i$ is projected by using a projection matrix and then transformed into $y_i=f(x_i, A_1, A_2)$.

However, in step S103 in FIG. 1, for the transformed image feature pair ($y_i$, $y_j$), similarity of the two is calculated by using the similarity probability function shown in the foregoing formula (1) to obtain a similarity result. The similarity result is compared with a preset threshold. When the similarity result is greater than the threshold, it indicates that the obtained client feature and pre-stored template image feature belong to a same category of individuals; otherwise, the obtained client feature and pre-stored template image feature do not belong to a same category. Certainly, the similarity of the two may also be calculated according to a similarity metric function, and no further details are provided herein again.

In the present disclosure, it is found during a research process that for any input image feature pair, based on this algorithm, face verification is improved greatly. Using labeled faces in the wild (LFW) of a standard test database as an example, under a single feature SIFT, a face verification rate is 0.6 by using original PCLDA. However, based on feature projection and similarity calculation provided in the present disclosure, the face verification rate is 0.80, and after metric learning of a double-layer neural network is added, the face verification rate is improved to 0.89.

This embodiment of the present invention is applicable to any face verification and recognition situation. In a face recognition application, the method provided in the present disclosure may also be used to calculate similarity between a test image and a template image, so as to classify test samples.

Figure 4:
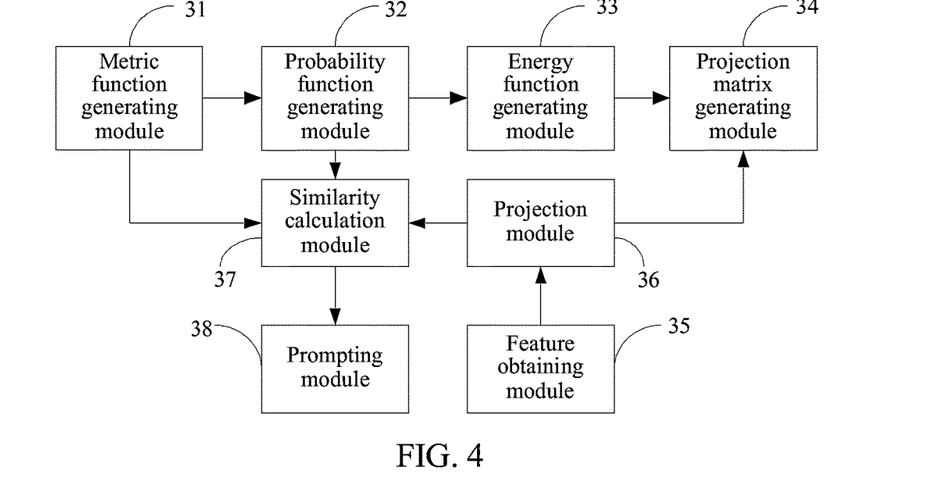
FIG. 4 is a schematic structural diagram of a preferred embodiment of an apparatus for recognizing a client feature according to the present disclosure.

Referring to FIG. 4, FIG. 4 is a schematic structural diagram of a preferred embodiment of an apparatus for recognizing a client feature according to the present disclosure.

The apparatus for recognizing a client feature includes: a metric function generating module 31, a probability function generating module 32, an energy function generating module 33, a projection matrix generating module 34, a feature obtaining module 35, a projection module 36, a similarity calculation module 37, and a prompting module 38.

The metric function generating module 31 is configured to generate a similarity metric function, where the similarity metric function is used to collect statistics on a pre-stored template image feature. The probability function generating module 32 is configured to generate a similarity probability function according to the similarity metric function.

The energy function generating module 33 is configured to generate an energy function according to the similarity probability function, where the similarity metric function includes a projection matrix. The projection matrix generating module 34 is configured to train a first template image feature of a same object and a second template image feature of a different object by using the energy function, to form the projection matrix. The projection matrix generating module 34 trains the energy function in a manner of gradient descent, to form the projection matrix.

During recognition of a client feature (such as a face image), the feature obtaining module 35 is configured to obtain a client feature, and obtain a pre-stored template image feature. The client feature described in the present disclosure includes a face image, and also includes a retinal image, a fingerprint image, or the like, all of which fall within the protection scope of the present disclosure, and are not described herein one by one.

The projection module 36 is configured to: project the obtained client feature and template image feature according to a preset projection matrix, to generate a projection feature pair. In this embodiment of the present invention, the projection matrix is formed by training of the first template image feature of a same object and the second template image feature of a different object.

The similarity calculation module 37 is configured to perform similarity calculation on the projection feature pair according to a preset similarity calculation rule (for example, a similarity probability function), to generate a similarity result. The prompting module 38 is configured to prompt the generated similarity result to a client.

The similarity calculation rule includes a similarity metric function or a similarity probability function. The similarity metric function is used to generate a first-dimension similarity result; while the similarity probability function is used to generate a second-dimension similarity result.

Figure 5:
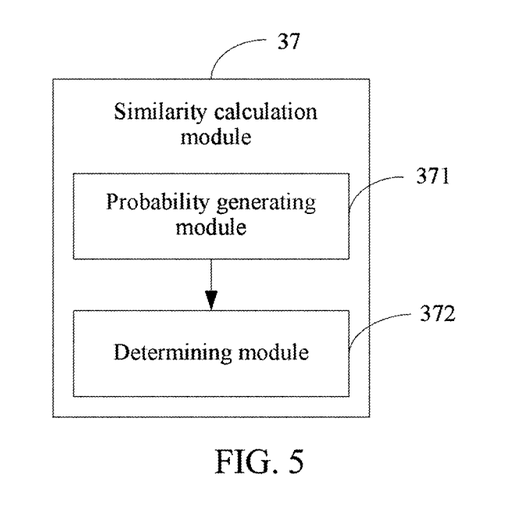
FIG. 5 is a schematic structural diagram of a preferred embodiment of a similarity calculation module according to an embodiment of the present invention.

Referring to FIG. 5, FIG. 5 is a schematic structural diagram of a preferred embodiment of the similarity calculation module 37 according to this embodiment of the present invention. The similarity calculation module 37 specifically includes a probability generating module 371 and a determining module 372.

The probability generating module 371 is configured to perform similarity calculation on the projection feature pair according to the preset similarity probability function, to generate a similarity probability. The determining module 372 is configured to determine whether the similarity probability is greater than or equal to a preset threshold; if the similarity probability is greater than or equal to the preset threshold, determine that the client feature and the pre-stored template image feature belong to a same category; and if the similarity probability is less than the preset threshold, determine that the client feature and the pre-stored template image feature do not belong to a same category.

For a detailed working principle of each module of the apparatus for recognizing a client feature, refer to detailed descriptions of the method for recognizing a client feature, and no further details are provided herein again. In the present disclosure, a projection matrix and a similarity calculation rule are preset, where the projection matrix is formed by training of a first template image feature of a same object (a positive sample) and a second template image feature of a different object (a negative sample); therefore, in the present disclosure, category information of a training sample is not needed, thereby improving image recognition efficiency; moreover, learning based on a positive and negative sample avoids requirements of various learning problems on the training sample, and under an uncontrollable collecting environment, identification information extraction can be implemented better, and further, an image recognition accuracy rate is also improved.

The apparatus for recognizing a client feature provided in this embodiment of the present invention is formed at a terminal. The terminal is, for example, a computer, a tablet computer, or a mobile phone having a touch function. The apparatus for recognizing a client feature and the method for recognizing a client feature that is described in the foregoing embodiments belong to a same idea. Any method provided in the embodiments of the method for recognizing a client feature may be run on the apparatus for recognizing a client feature. For a specific implementation process of the method, refer to the embodiments of the method for recognizing a client feature, and no further details are provided herein again.

It should be noted that: For the method for recognizing a client feature in the embodiments of the present invention, a person of ordinary skill in the art may understand that all or some processes of implementing the method for recognizing a client feature in the embodiments of the present invention may be implemented by a computer program controlling relevant hardware; the computer program may be stored in a computer readable storage medium, for example, stored in a memory of a terminal, and is executed by at least one processor in the terminal, and during a execution process, procedures of the embodiments of the methods may be included. The storage medium may be a magnetic disk, an optical disc, a read only memory (ROM), a random access memory (RAM), or the like.

For the apparatus for recognizing a client feature in the embodiments of the present invention, functional modules of the apparatus may be integrated into one processing chip, or each of the modules may exist alone physically, or two or more modules may be integrated into one unit. The integrated unit may be implemented in the form of hardware, or may be implemented in the form of a software functional unit. If the integrated module is implemented in a form of a software functional module and is used or sold as an independent product, the integrated module may also be stored in a computer readable storage medium. The storage medium is, for example, a ROM, a magnetic disk, or an optical disc.

In conclusion, although the present disclosure is disclosed above by using preferred embodiments, the foregoing preferred embodiments are not intended to limit the present disclosure. A person of ordinary skill in the art may make various change or modification within the spirit and principle of the present disclosure. Therefore, the protection scope of the present disclosure is subject to the scope defined by the claims.

What is claimed is:

1. A method for recognizing a client feature, comprising:
   obtaining a client feature and a pre-stored template image feature;
   projecting the obtained client feature and the obtained pre-stored template image feature according to a preset projection matrix, to generate a projection feature pair, the preset projection matrix being formed by training an energy function using first template image features of a same object and second template image features of different objects;
   performing similarity calculation on the projection feature pair according to a preset similarity calculation rule, to generate a similarity result; and
   prompting the generated similarity result;
   wherein the preset similarity calculation rule comprises a similarity probability function, and the similarity probability function is generated according to a preset similarity metric function; and
   the energy function comprises the preset projection matrix and the preset projection matrix is obtained by training the energy function until similarity between the first template image features of the same object is the greatest and similarity between the second template image features of the different objects is the smallest;
   wherein a formula of the similarity probability function is:

$$QCS(x_i, x_j) = (1 + \exp(dist(x_i, x_j) - b))^{-1}$$

wherein, $(x_i, x_j)$ is an image feature pair formed by two different template image features, b is a metric parameter, QCS is the similarity probability function, dist is the preset similarity metric function, and exp is an exponential function with a base being a natural logarithm e.

2. The method for recognizing a client feature according to claim 1, wherein the step of generating a similarity result comprises:
   performing similarity calculation on the projection feature pair according to the similarity probability function, to generate a similarity probability;
   determining whether the similarity probability is greater than or equal to a preset threshold;
   if the similarity probability is greater than or equal to the threshold, determining that the client feature and the pre-stored template image feature belong to a same category; and
   if the similarity probability is less than the threshold, determining that the client feature and the pre-stored template image feature do not belong to a same category.

3. The method for recognizing a client feature according to claim 1, wherein before forming the preset projection matrix, the method further comprises:
   when the client feature and the pre-stored template image feature are obtained, generating the preset similarity metric function, which is used to collect statistics on the pre-stored template image feature;
   generating the similarity probability function according to the preset similarity metric function;
   generating the energy function according to the preset similarity metric function and the similarity probability function.

4. The method for recognizing a client feature according to claim 3, wherein the step of forming the preset projection matrix comprises:
   training the energy function in a manner of gradient descent, to form the preset projection matrix.

5. An apparatus for recognizing a client feature, comprising:
   memory;
   one or more processors; and
   one or more programs stored in the memory and configured for execution by the one or more processors, the one or more programs comprising the following instruction modules:
   a feature obtaining module, configured to obtain a client feature, and obtain a pre-stored template image feature;
   a projection module, configured to project the obtained client feature and the obtained pre-stored template image feature according to a preset projection matrix, to generate a projection feature pair, the preset projection matrix being formed by training an energy function using first template image features of a same object and second template image features of different objects;
   a similarity calculation module, configured to perform similarity calculation on the projection feature pair according to a preset similarity calculation rule, to generate a similarity result; and
   a prompting module, configured to prompt the generated similarity result;
   wherein the preset similarity calculation rule comprises a similarity probability function, and the similarity probability function is generated according to a preset similarity metric function; and
   the energy function comprises the preset projection matrix and the preset projection matrix is obtained by training the energy function until similarity between the first template image features of the same object is the greatest and similarity between the second template image features of the different objects is the smallest;
   wherein a formula of the similarity probability function is:

$$QCS(x_i, x_j) = (1 + \exp(dist(x_i, x_j) - b))^{-1}$$

wherein, $(x_i, x_j)$ is an image feature pair formed by two different template image features, b is a metric parameter, QCS is the similarity probability function, dist is the preset similarity metric function, and exp is an exponential function with a base being a natural logarithm e.

6. The apparatus for recognizing a client feature according to claim 5, wherein the similarity calculation module comprises:
   a probability generating module, configured to perform similarity calculation on the projection feature pair according to the similarity probability function, to generate a similarity probability; and
   a determining module, configured to determine whether the similarity probability is greater than or equal to a preset threshold; if the similarity probability is greater than or equal to the preset threshold, determine that the client feature and the pre-stored template image feature belong to a same category; and if the similarity probability is less than the preset threshold, determine that the client feature and the pre-stored template image feature do not belong to a same category.

7. The apparatus for recognizing a client feature according to claim 5, further comprising:
   a metric function generating module, configured to: generate the preset similarity metric function, and collect statistics on the pre-stored template image feature by using the preset similarity metric function;
   a probability function generating module, configured to generate the similarity probability function according to the preset similarity metric function;
   an energy function generating module, configured to generate the energy function according to the preset similarity metric function and the similarity probability function; and
   a projection matrix generating module, configured to train the energy function using the first template image features of the same object and the second template image features of the different objects.

8. The apparatus for recognizing a client feature according to claim 7, wherein the projection matrix generating module is further configured to train the energy function in a manner of gradient descent, to form the preset projection matrix.

9. A non-transitory storage medium, having a processor executable instruction stored therein, and the processor executable instruction being used to enable a processor to complete the following operations:
   obtaining a client feature and a pre-stored template image feature;
   projecting the obtained client feature and the obtained pre-stored template image feature according to a preset projection matrix, to generate a projection feature pair, the preset projection matrix being formed by training an energy function using first template image features of a same object and second template image features of different objects;
   performing similarity calculation on the projection feature pair according to a preset similarity calculation rule, to generate a similarity result; and
   prompting the generated similarity result;
   wherein the preset similarity calculation rule comprises a similarity probability function, and the similarity probability function is generated according to a preset similarity metric function; and
   the energy function comprises the preset projection matrix and the preset projection matrix is obtained by training the energy function until similarity between the first template image features of the same objet is the greatest and similarity between the second template image features of the different objects is the smallest;
   wherein a formula of the similarity probability function is:

$QCS(x_i,x_j)=(1+\exp(dist(x_i,x_j)-b))^{-1}$ wherein, $(x_i, x_j)$ is an image feature pair formed by two different template image features, b is a metric parameter, QCS is the similarity probability function, dist is the preset similarity metric function, and exp is an exponential function with a base being a natural logarithm e.

10. The non-transitory storage medium according to claim 9, wherein the processor executable instruction stored in the storage medium is further used to enable the processor to complete the following operations:
    when similarity calculation is performed on the projection feature pair according to the preset similarity calculation rule to generate the similarity result, first performing similarity calculation on the projection feature pair according to the similarity probability function, to generate a similarity probability, then determining whether the similarity probability is greater than or equal to a preset threshold;
    if the similarity probability is greater than or equal to the threshold, determining that the client feature and the pre-stored template image feature belong to a same category; and
    if the similarity probability is less than the threshold, determining that the client feature and the pre-stored template image feature do not belong to a same category.

11. The non-transitory storage medium according to claim 9, wherein the processor executable instruction stored in the storage medium is further used to enable the processor to complete the following operations:
    when the client feature and the pre-stored template image feature are obtained, generating the preset similarity metric function, which is used to collect statistics on the pre-stored template image feature;
    generating the similarity probability function according to the preset similarity metric function;
    generating the energy function according to the preset similarity metric function and the similarity probability function; and
    training the first template image features of the same object and the second template image features of the different objects by using the energy function, to form the preset projection matrix.

12. The non-transitory storage medium according to claim 11, wherein the processor executable instruction stored in the storage medium is further used to enable the processor to complete the following operations:
    when the first template image features of the same object and the second template image features of the different objects are trained by using the energy function, to form the preset projection matrix, training the energy function in a manner of gradient descent, to form the preset projection matrix.

* * * * *